Dec. 12, 1950  A. E. KITTREDGE  2,533,587
CONTROLLER

Filed Sept. 11, 1944  4 Sheets-Sheet 1

WITNESS:
Robt. P. Kitchel.

INVENTOR
Arthur E. Kittredge
BY
Busser & Harding
ATTORNEYS.

Patented Dec. 12, 1950

2,533,587

UNITED STATES PATENT OFFICE 2,533,587

CONTROLLER

Arthur E. Kittredge, Audubon, N. J., assignor, by mesne assignments, to Reconstruction Finance Corporation, Philadelphia, Pa., a corporation of the United States Application September 11, 1944, Serial No. 553,615

5 Claims. (Cl. 318—21)

This invention relates to controllers of the type adapted to maintain constant or substantially constant some condition in a system by providing automatic regulation of the system. Specifically the invention relates to an electrical type of controller which in its operation effects such control.

Controllers of the general type indicated have been developed primarily along pneumatic or hydraulic principles. The securing of similar results electrically is attended with difficulties and heretofore has involved the use of electro-mechanical systems embodying reversing motors and the like. The broad object of the present invention may be stated to be the provision of a controller of electrical type of comparatively simple nature. More specifically the improved controller involves non-moving electrical elements, the only parts moving in operation being involved in the input and at the output of the control proper. Preferably the electrical current representing the response of the control gives rise to a variable pressure by which corrective action is secured.

The above indicated objects and further objects of the invention particularly relating to details will become apparent from the following description read in conjunction with the accompanying drawing in which.

Figure 1:
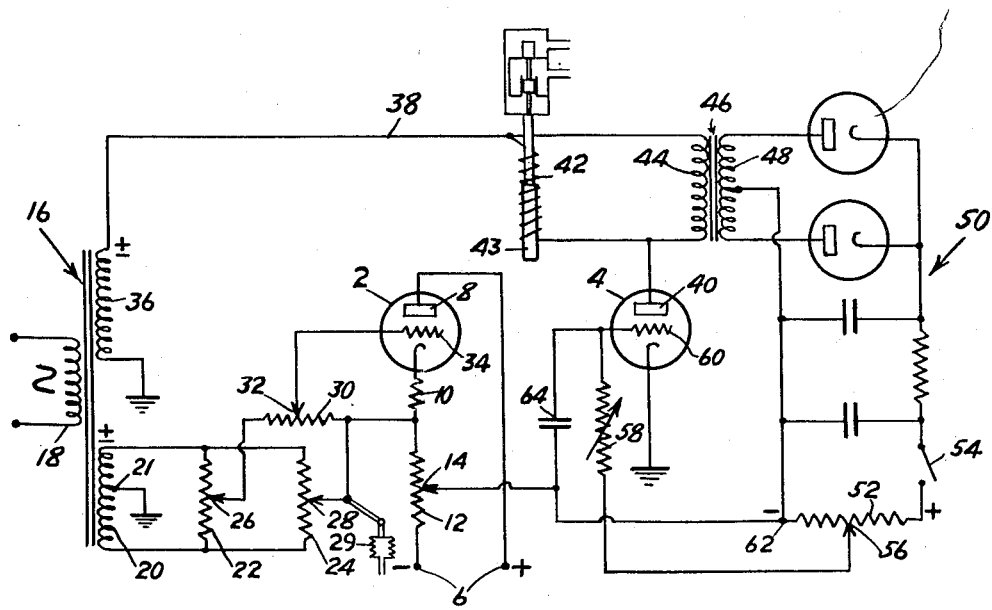
Figure 1 is a diagram showing a control circuit provided in accordance with the present invention and embodying a reset effect.

Referring first to Figure 1, there is illustrated therein a control circuit which embodies a so-called reset effect. This circuit comprises two tubes 2 and 4, which are illustrated as triodes though, as will be evident hereafter, they may equally well be tetrodes, pentodes, or other multiple element types of tubes. As will become clear hereafter, the tube 2 is an amplifier while the tube 4 may be designated a power tube supplying the necessary output for effecting the controlling operation. The tube 2 has a D. C. supply indicated at 6, the positive terminal of which connects with the plate 8 while the negative terminal is connected to the cathode through resistor 10 and potentiometer 12, the latter having a variable contact indicated at 14 from which potential is applied to the grid of the second tube 4.

A transformer 16 has a primary 18 which may be connected to a commercial alternating current line as indicated. The supplied frequency may be any of the ordinary commercial frequencies and, in fact, under special conditions, rather low frequencies may be supplied, it being sufficient for purposes of satisfactory operation only that the frequency be sufficiently high so that the period of the supply current is short compared to any time of substantial change of average control current values.

The transformer 16 has two secondaries of which one indicated at 20 is arranged to deliver current to parallel potentiometers 22 and 24. A center tap of the secondary 20 is grounded at 21. The movable contacts 26 and 28 of the respective potentiometers are connected to the terminals of a third potentiometer 30, the adjustable contact of which is joined to the grid 34 of the tube 2. One end of the potentiometer 30 is connected between the resistor 10 and the potentiometer 12.

The second secondary 36 of the transformer 16 has one end grounded while its other end is connected through the line 38 to the parallel array of a solenoid 42 and the primary 44 of a transformer 46, which are, in turn, connected to the plate 40 of the tube 4.

As will be pointed out hereafter, the solenoid 42 supplies the controlling power acting, for example, upon a plunger 43 to which reference will be made hereafter.

The secondary 48 of the transformer 46 forms the supply for a full wave rectifier 50 embodying rectifying tubes and a filter of conventional type arranged to supply through a switch 54 a direct potential across a potentiometer 52. The adjustable contact 56 of the potentiometer 52 is connected to the grid 60 of the tube 4 through an adjustable resistance 58. The negative end of the potentiometer 62 is connected to the contact 14 of the potentiometer 12 and through the condenser 64 to the grid 60.

In the application of this system to control operations, the various potentiometer contacts 14, 32, and 56 are pre-set to secure desired operating conditions, the same being true of the resistance 58 which in certain instances may actually be fixed. The control of the circuit in response to some controlled condition which it is desired to maintain is effected through the variable contacts 26 and 28 of the potentiometers 22 and 24. One of these, for example, 26, is subject to manual adjustment to a fixed set position which will correspond to the desired value of the controlled variable which is to be maintained. The contact 28, on the other hand, is arranged to be movable in response to variations of such quantity from the predetermined set value. For example, the position of the contact 28 may be made responsive to pressure, temperature, speed, flow rate, or any other variable which it is desired be kept constant, as, for example, by a bellows diagrammed at 29 which might be pressure or temperature responsive.

The operation of the circuit of Figure 1 as a whole involves a combination of A. C. and D. C. operation. The plate of the tube 2 is supplied with D. C. while it will be evident that the grid 34 thereof is supplied with a signal potential which is dependent upon the difference between the relative positions of the contacts 26 and 28 on the potentiometers 22 and 24. It will be evident that if corresponding positions are maintained, no voltage drop will occur across the potentiometer 30 and, consequently, there will be no alternating voltage applied to the grid 34. As departure from balance occurs, a proportional voltage will be applied to the grid 34, the magnitude of which, corresponding to a particular degree of unbalance, is subject to adjustment by the positioning of the contact 32 of the potentiometer 30.

The net result of the foregoing is the superposition upon a D. C. bias appearing on the grid 60 of the tube 4 of an alternating potential through the condenser 64. In short, the grid 60 has applied to it the A. C. potential just indicated as well as a D. C. potential, the nature of which will be next considered. It will be assumed for purposes of explanation that the tube 2 is operating linearly so that the direct potential appearing at 14 will be substantially independent of the magnitude of the alternating potential applied to the grid 34 of the tube 2.

The potential applied across the plate and cathode of the tube 4 is unrectified A. C. As a consequence, this tube conducts current only during the half-cycle of the alternating current for which the plate is positive. It is evident, therefore, that the actual current flowing through the solenoid 42 and the primary 44 of the transformer 46 will be pulsating. The magnitude of the current which thus flows is dependent upon the potential existing on the grid 60 during the conducting half-cycle of the tube 4 and is evidently a function of both the D. C. potential applied to this grid and the A. C. potential applied to the grid 34 as indicated heretofore, of which the only part which is effective will be that corresponding to the half-cycle of conductivity of the tube. It will be assumed that the potential of the grid 60 is always negative so that there is a negligible grid current and, accordingly, no substantial rectifying action at the grid. It may further be assumed that the tube 4 is also operating linearly for purposes of explanation, the effects of non-linearity being, in this system, generally minor ones and affecting only slightly the nature of the operation. The fact that the current through the primary 44 of the transformer 46 is pulsating means that the alternating component will produce an alternating output from the secondary 48 into the rectifier-filter 50. Assuming that the wave shape is not substantially distorted, as will actually be the case under the conditions assumed, it will be evident that the alternating input of the rectifier will be substantially proportional to the direct component of the pulsating current through the tube 4 or, in fact, viewed more broadly, to the average value of the pulsating current through the solenoid 42. Assuming, therefore, that the rectifier-filter system 50 is also substantially linear in the sense that the D. C. potential provided across the potentiometer 52 is substantially proportional to the average value of the potential appearing at the secondary 48 of the transformer 46, it will be clear that the potential drop across the potentiometer 52 will also be substantially proportional to the average current through the solenoid 42.

The position of the contact 56 on the potentiometer 52 determines the proportion of this direct potential which is applied to the system consisting of the described combination of the condenser 64, the resistance 58, and the grid 60.

It may be noted that the reason for utilizing alternating current for the plate supply of the tube 4 is for the purpose of providing, by reason of the alternating component of the pulsating current through the tube, the feed-back potential proportional to the average value of the current through the tube 4.

Figure 2:
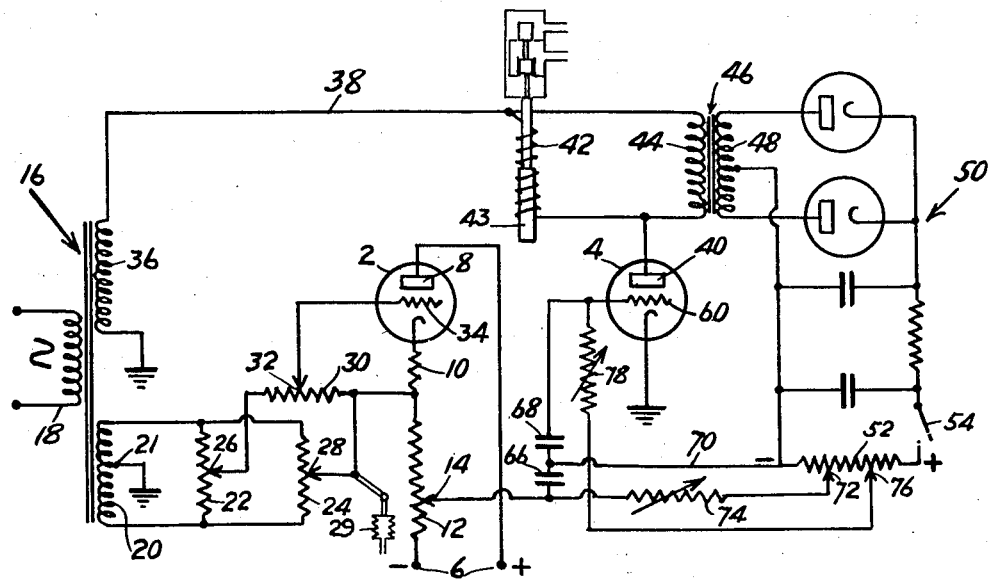
Figure 2 is a similar diagram of an alternative circuit which additionally embodies a rate effect.

The characteristics of the circuit of Figure 1 may be best described following reference to the modified circuit of Figure 2 which embodies a rate effect in addition to the reset effect. It will be evident from comparison of Figures 1 and 2 that the circuit of Figure 2 resembles very closely that of Figure 1 so far as the first tube and its input circuits are concerned and the solenoid and rectifier circuits are concerned. To indicate the correspondence, the parts of the circuits which are common to both are designated by the same reference characters.

In the case of the circuit of Figure 2, however, a difference is involved in the connections between the potentiometer 52, the grid 60 of the tube 4, and the contact 14 of the potentiometer 12. In this case the potentiometer 52 is provided with two contacts 72 and 76 which are independently adjustable to secure the desired operation. A pair of condensers 66 and 68 are arranged in series between the contact 14 and the grid 60. The contact 76 is connected to the grid 60 through a variable resistance 78 while the contact 72 is connected to the contact 14 and the corresponding side of the condenser 66 through a variable resistance 74. The negative end of the potentiometer 52 is connected through the line 70 to the point between the condensers 66 and 68.

Again, so far as potentials are concerned, there will appear across the potentiometer 52 a direct potential which is substantially proportional to the average value of the current through the tube 4.

Figures 3, 4:
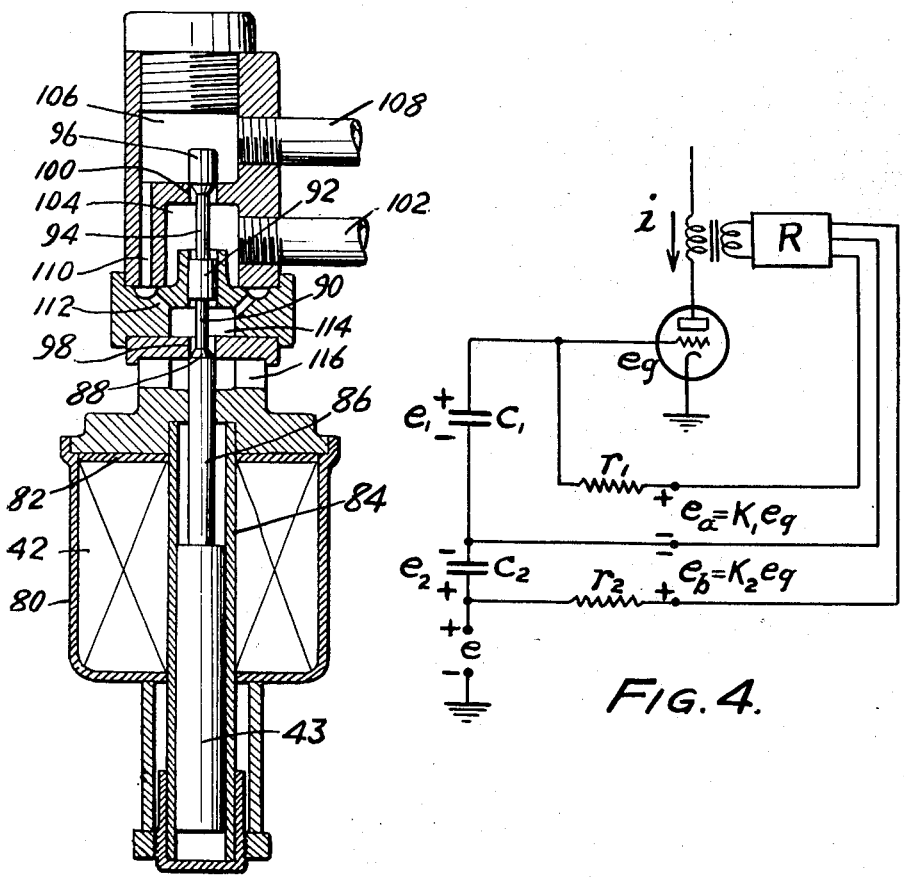
Figure 3 is a sectional view showing a magnetically controlled valve which gives rise to pressures linearly related to electrical currents.
Figure 4 is a simplified diagram illustrative of the operation of the circuit of Figure 2.

The characteristics of the control system of Figure 2 may be made clear from consideration of the diagram of Figure 4. The rectifying system, designated R in Figure 4 has the effect of providing feed-back potentials $e_a$ and $e_b$ as indicated which are respectively proportional to $e_g$, the grid potential, which in turn, assuming substantial linearity of the tube characteristics, is linearly proportional to the current $i$ which effects the controlling operation. So long as the frequency is high compared to rates of change in the system, direct currents, the averages of the pulsating currents actually existing, may be considered, and of these there need be taken into account only variations thereof from particular zero conditions. The various $e$'s in the diagram are therefore to be considered the varying averages of the pulsating potentials actually existing.

The differential equations relating the various $e$'s are the following:

(1) $\quad e_g - e_1 + e_2 = e$
(2) $\quad K_1 e_g - e_1 - r_1 C_1 \dot{e}_1 = 0$
(3) $\quad K_2 e_g - e_2 - r_2 C_2 \dot{e}_2 = 0$ in which $e$ is the variation of the controlling potential applied to the circuit by the displacement of contact 28 referred to in connection with Figure 2.

The set of Equations 1, 2, and 3 cannot be solved unless some functional form is assigned to $e$. It can be shown, however, that in general the solution for $e_g$, involving a steady state term and a transient term, is such that the former is made up of two parts, one proportional to the value of $e$ and the other to the rate of change of $e$, while the latter involves a damped function the rate of damping of which may be so small, due to proper choice of $K_1$, $K_2$ and the products $r_1 C_1$ and $r_2 C_2$, that it represents a drift of $e_g$ of long duration occasioned by the change in $e$. The function subject to damping may be, theoretically, either aperiodic or periodic, but in the latter case the period is so long that, in view of the corrective action occurring in any actual case, it may be neglected.

In brief, the response of $e_g$ to a change in $e$ involves, in conventional control terms, a proportional response, (proportional to $e$), a rate effect, (proportional to the first time derivative of $e$), and a floating response initiated by a change of $e$ but approximately a linear function of $t$.

Susceptible to simpler analysis is the system of Figure 1 which gives rise to Equations 1 and 2, 3 disappearing in the absence of the second feed-back involved in Figure 2. In this case the rate effect is missing. The floating action, added to a proportional response, takes the form of linear drift with time when $K_1$ is precisely equal to unity and the circuit is linear. For such an adjustment of $K_1$ a constant deviation of $e_g$ is theoretically obtained, brought to a stop by the corrective action of the system controlled. For $K_1$ slightly less than, but nearly equal to unity, $e_g$ closely approaches a linear drift with time, and produces, for all practical purposes, a drift of the desired nature with the added advantage of sufficient stability to overcome any deviation from linearity in the characteristics of the control components. For $K_1$ greater than unity, an unstable condition would result unless corrected by non-linearity of the circuit. For actual operation $K_1$ should be close to, but not exceeding, unity.

To make clear the nature of the control effected by the current through the solenoid 42, there is illustrated in Figure 3 a type of air or fluid control valve which has been merely diagrammed in Figures 1 and 2. As illustrated in Figure 3, the solenoid 42 is iron-clad by a casing 80 and its cover 82 and is arranged to pull upwardly against the action of gravity the plunger 43 which is arranged to slide in a brass or similar tube 84, which may be slotted longitudinally to avoid the formation of a short-circuiting secondary for the solenoid, to avoid induction of substantial currents due to the pulsating current therethrough. For similar reasons, the cover 82 may be radially slotted.

A stem 86 resting on the plunger 43 comprises valve members 88 and 96 joined by reduced connections 90 and 94 and a piston 92. The valve member 88 coacts with a bore 98 and the valve member 96 coacts with a bore 100 in the valve housing as illustrated, while the piston 92 is arranged in a cylinder in a central portion of the housing. The housing provides chambers 104, 106, and 114 as indicated. A supply of air or other fluid, as for example a liquid if a hydraulic control arrangement is utilized, enters the chamber 104 through the connection 102. Connection 108 joined to the chamber 106 provides the output line for the controlling air or fluid pressure. The chambers 106 and 114 are joined by passages 110 and 112. Venting to the atmosphere, or, in the case of liquids, to a sump, is provided through the passages 116.

It will be evident that if the inner edges of valve members 96 and 88 are spaced just slightly less than the outer edges of the bores 100 and 98, so that only very small movement of the stem and valves is necessary to open the valves for fluid flow, and if the valves 96 and 88 and piston 92 have the same diameter, an equilibrium is reached whenever the downward force exerted on the area of the valve 96 by the pressure in chamber 106 is equal to the upward force exerted by the plunger 43 on the stem 86 less the weight of the stem and movable valve parts attached thereto. Any excess of pressure in chamber 106 above the equilibrium value will result in venting of it to the atmosphere; any deficiency will open it to the supply through passage 100. Since the departures of the movable valve assembly from its closed position for either of these fluid-passing actions is very slight, the plunger 43 will at all times remain in substantially the same position with respect to the solenoid. The upward force exerted on it is then substantially proportional to the current through the solenoid and the pressure in chamber 106 is, in turn, linearly related to this current.

The circuits of Figures 1 and 2 are capable of being modified to substantial extents without departing from the principles of operation heretofore described.

Figure 5:
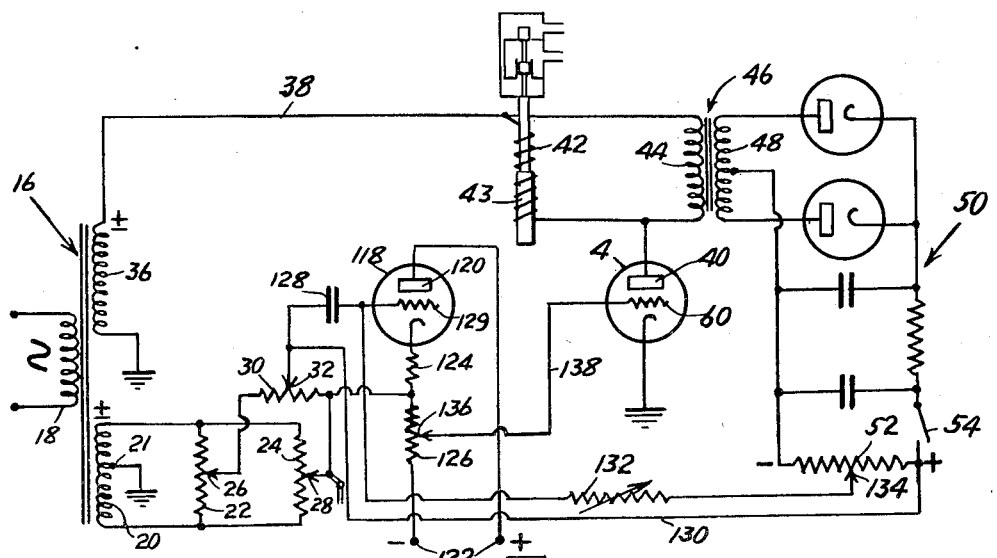
Figure 5 is a diagram showing a circuit similar to that of Figure 1, but involving an alternative arrangement of feed-back.

In Figure 5, for example, there is disclosed a modification corresponding to Figure 1 but involving feed-back to the first tube rather than to the second. In this modification the input arrangement is similar to that of Figure 1, as is also the rectifier-filter system providing the feed-back potential taken from the potentiometer 52. Accordingly, the corresponding parts of the two circuits have been designated by similar reference characters. In the case of the circuit of Figure 5, however, the tube 118 replaces the tube 2 of Figure 1 and has its plate 120 supplied with a positive potential from the D. C. source 122. The cathode of tube 118 is connected through the resistor 124 and the potentiometer 126 to the negative terminal of the D. C. supply 122.

The grid 129 of the tube 118 is, in this modification, connected to the contact 32 of the potentiometer 30 through a condenser 128. The positive end of the potentiometer 134 is connected to the contact 32 by the line 130 while the contact 134 of the potentiometer 52 is connected through the adjustable resistor 132 to the grid 129. The contact 136 of the potentiometer 128 is connected through 138 to the grid 60 of the tube 4. In this arrangement, it will be evident that the A. C. potential appearing at 32 will be applied to the grid 129 through the condenser 128 to produce an alternating potential at 136 applied to the grid 60 of tube 4. At the same time, the D. C. feed-back potential is applied to the grid 60 indirectly by reason of its application to the grid 129 of the first tube and thence through the cathode circuit of that tube to the grid 60. It will be evident without further discussion that the net result is the imposition upon the grid 60 of alternating and direct potentials precisely the same as in the modification of Figure 1. In this case, of course, an amplification of the D. C. feed-back potential takes place due to the interposition of the first tube in the feed-back circuit.

Figure 6:
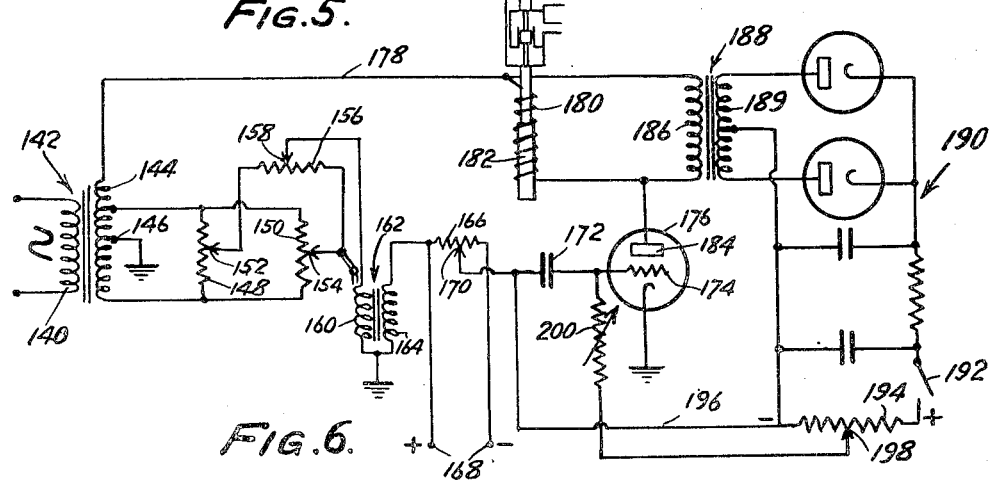
Figure 6 is a diagram of another alternative circuit from which primary amplification is omitted.

In the modification of Figure 6, the first tube is dispensed with, as will be evident as a possibility since its function is primarily that of amplification. In this circuit a transformer 142 has its primary 140 supplied with alternating current, and its secondary 144, by the provision of a suitable tap, serves to provide the alternating input for the control network as well as the power input for the tube. The network involves, as in the previous modifications, a parallel arrangement of potentiometers 148 and 150 with a suitable ground connection 146 of the transformer secondary. The contacts 152 and 154 of the potentiometers are connected by another potentiometer 156, the contact 158 of which is connected to the primary 160 of a transformer 162. The secondary 164 of this transformer, connected at one end to the end of the primary 160 and grounded, has its other end connected to a potentiometer 166 across which there is a D. C. potential applied from a source 168. The contact 170 of the potentiometer 166 is connected through the condenser 172 to the grid 174 of the tube 176.

The power current from the transformer 144 is applied through the line 178 and the solenoid 180 and primary 186 of transformer 188 to the plate 184 of tube 176, in this respect the connection being similar to that of the preceding modifications.

The secondary 189 of the transformer 188 supplies the rectifier-filter circuit 190 to apply a potential to the potentiometer 194 through the switch 192. The negative end of the potentiometer 194 is connected to the contact 170 through the line 196 while the contact 198 of the potentiometer 194 is connected through the adjustable resistor 200 to the grid 174.

It will be evident that this modification also has essentially the same characteristics as the circuit of Figure 1, there being applied to the grid 174 an A. C. potential through the condenser 172 corresponding to the deviation of the control from the set point, while a D. C. feed-back potential is applied to the grid from the potentiometer 194 which is supplied with a direct current through the rectifier-filter combination by the alternating component of the pulsating current through the plate circuit of the tube.

While the modifications of Figures 5 and 6 have been shown as involving only the single feed-back corresponding to that of Figure 1, it will be evident that the rate effect may be introduced in a fashion similar to that of Figure 2 merely by the introduction of a second feed-back circuit and condenser in each of the modifications. Fundamentally, therefore, the same characteristics of operation exist.

It will be evident from Equations 1, 2, and 3 given above that the expressions $r_1C_1$ and $r_2C_2$ (the conventional time constants of the resistance-condenser combinations) appear as unitary expressions on which the characteristics of the systems depend. For control applications it is necessary that these time constants be quite large, which would mean that the indicated resistances or condensers would necessarily be correspondingly large. From the practical standpoint, upper limits of both of these are reached considerably before the necessary time constants are secured. The condenser, for example, must be quite bulky and have very high leakage resistance, the latter condition being difficult to obtain with very large condensers except under laboratory conditions. Similarly, it is very difficult to maintain extremely high resistances of resistors except under laboratory conditions. For these reasons, it is desirable to embody in the circuits time-constant multiplying arrangements.

Figure 7:
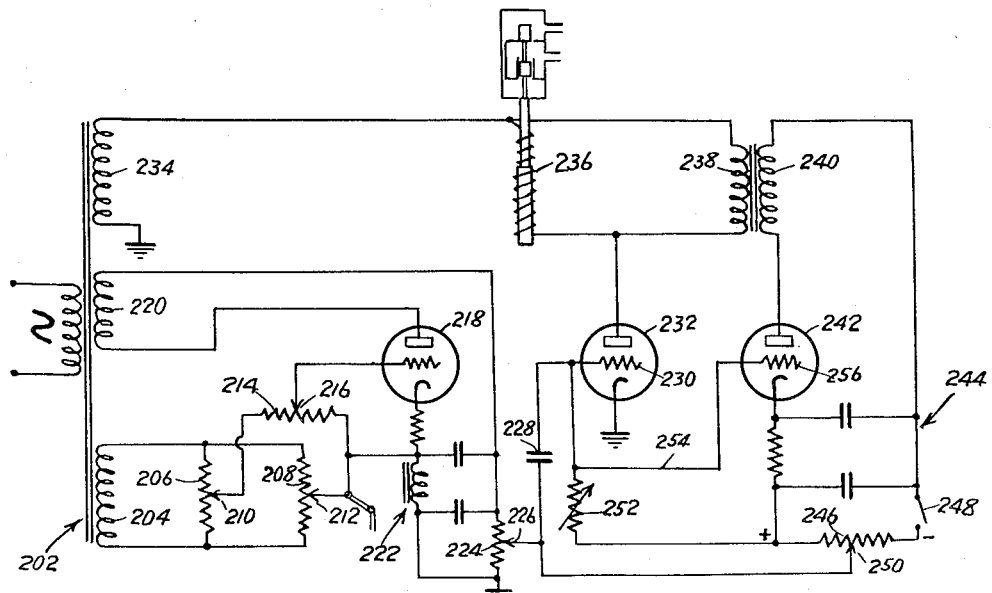
Figure 7 is a diagram of still another modification involving a time-constant multiplying system.

In Figure 7 there is illustrated a further type of control system embodying such a time-constant multiplying system as well as embodying certain other slight modifications of the control circuit. A comparison may be particularly made with the circuit of Figure 1 which it resembles to a considerable extent.

In Figure 7 a transformer 202, the primary of which is supplied with alternating current, has three secondaries, of which one, indicated at 204, supplies current in parallel to two potentiometers 206 and 208 the contacts 210 and 212 of which are bridged by another potentiometer 214, the variable contact 216 of which is connected to the grid of tube 218. This arrangement, it will be evident, is similar to that in Figure 1, tube 218 corresponding to tube 2.

In this modification, however, the tube 218 has its plate supplied with alternating current from the secondary 220 of the transformer 202. The cathode circuit of the tube embodies a filter indicated at 222, the output of which passes to a potentiometer 224 grounded as indicated and provided with an adjustable contact 226. This contact 226 is connected through the condenser 228 to the grid 230 of the power tube 232, corresponding to tube 4 of Figure 1, the plate of which is supplied from the secondary 234 of transformer 202 through the controlling solenoid 236 and the transformer primary 238 as in the modification of Figure 1.

The secondary 240 of the transformer last mentioned supplies a half-wave rectifier-filter arrangement comprising the triode 242 and the filter system 244 to supply a direct current to the potentiometer 246 through the switch 248. The contact 250 of the potentiometer 246 is connected to the contact 226 while the positive end of this potentiometer is connected through the variable resistor 252 to the grid 230 of the tube 232.

Passing for the moment the fact that 242 is a triode, it will be evident that the operation would be substantially equivalent to that of Figure 1 and subject to the same analysis as has been heretofore given, with the difference, however, that from the contact 226 of potentiometer 224 there is supplied not an alternating but a direct potential to the grid 230 of the power tube. It will be evident that this makes no essential difference in the fundamental operation. Since the power tube in Figure 1 had its plate supplied with alternating current, the only effective potential on the grid having a controlling action was the half-wave potential of the grid corresponding to the half-wave giving rise to a positive plate potential. In the case of Figure 7, the direct potential functions at the same time and, like the operating part of the alternating potential in the modification of Figure 1, it is related to the differential positions of the contacts 210 and 212, one of which is set at a control point and the other of which varies therefrom in accordance with the variations of the characteristic intended to be maintained constant.

The grid 256 of the tube 242 is connected through the line 254 to the grid 230 of the tube 232; i. e., between the resistor 252 and the condenser 228. Its function is to control the current flow through the triode 242 acting as a rectifier to the end that the time constant of the resistor-condenser combination is very substantially increased in a ratio roughly proportional to the amplification factor of the tube 242. Since this may be with known tubes as high as about 100, it will be seen that very large time constants may be secured while having resistors and condensers of practical sizes and types involved in the circuit. From the standpoint of operation, the grid control gives rise to a circuit which is merely the equivalent of increasing the size of resistor 58 and condenser 64 in the modification of Figure 1, or of resistor 252 and condenser 228 in the modification of Figure 7 if the grid connection did not exist and a diode was substituted for the triode 242.

Figure 8:
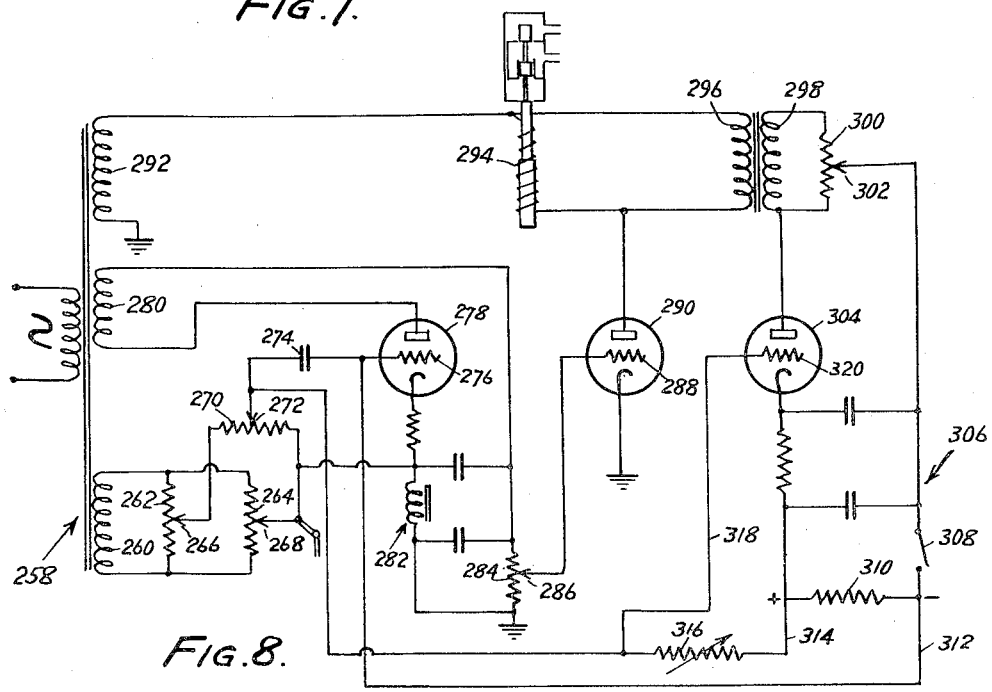
Figure 8 is another diagram showing a further modification also embodying a time-constant multiplying arrangement.

Figure 8 illustrates a circuit of a type somewhat similar to that of Figure 7 but comparable with the modification of Figure 5 in that the feed-back is connected to the grid of the amplifier tube 278 rather than to the grid of the power tube. In Figure 8 the transformer 258 has one secondary 260 feeding the parallel potentiometers 262 and 264, the contacts 266 and 268 of which are connected to the potentiometer 270, the contact 272 of 270 being connected to the grid 276 of the amplifier tube 278 through a condenser 274 rather than directly as in Figure 8. As in the case of the modification of Figure 7, a second winding 280 of the transformer supplies plate current to the amplifier tube 278 which has in its cathode circuit a filter 282 resulting in the supplying of direct current to potentiometer 284, the contact 286 of which is directly connected to the grid 288 of the power tube 290. This power tube is supplied with alternating current from a third secondary 292 of the transformer 258 through the power solenoid 294 and the primary 296 of a transformer.

The secondary 298 of this transformer supplies current to a potentiometer 300, one end of which and the contact 302 of which are connected to the rectifier-filter combination consisting of the triode 304 and the filter 306 to supply direct current through the switch 308 to the resistor 310. In this case, the adjustment of the feed-back is controlled at the potentiometer 300 rather than at a potentiometer such as 246 located in Figure 7 in the position of the resistor 310. The negative end of the resistor 310 is connected through the line 312 to the grid 276 of the tube 278. The positive end of resistor 310 is connected to the variable resistor 316 by the line 314 and through it to the contact 272, that is, to the side of the condenser 274 opposite that connected to the grid 276.

The grid 320 of the tube 304 is connected as shown between the resistor 316 and the contact 272.

It will be evident that, subject to the minor changes heretofore described, the circuit of Figure 8 functions in the same fashion as that of Figure 5 with multiplication of the time constant and with filtered direct potential applied to the grid of the power tube, as compared with pulsating potential applied in the modification of Figure 5.

It will be evident that while the modifications of Figures 7 and 8 show only a single feed-back arrangement, a double feed-back of the character of that shown in Figure 2 may be readily supplied consistently with the other modifications of the circuit.

What I claim and desire to protect by Letters Patent is:

1. In a control device, a thermionic tube having a cathode, grid and anode, grid-cathode and anode-cathode circuits, means for supplying alternating current to the anode-cathode circuit, means for providing in the grid-cathode circuit an alternating potential which is a function of the deviation of a condition from a predetermined set point, a rectifier circuit, means supplying to the rectifier circuit an input related to the alternating component of the pulsating anode current of the tube, a plurality of condensers in the grid-cathode circuit, a plurality of resistances connected thereto, and means for charging said condensers through said resistances by application of direct potentials from said rectifier circuit, said condensers during charging serving to change oppositely said anode current.

2. In a control device, means providing an alternating potential which is a function of the deviation of a condition from a predetermined set point and which reverses phase with change of direction of said deviation; a thermionic tube having an anode, a cathode and a control grid; an anode-cathode circuit associated with said tube; means providing an alternating current supply to the anode-cathode circuit of said tube; means responsive to said alternating potential providing through said tube a pulsating anode-cathode current having one component approximately proportional to the magnitude of said potential and changing sign with reversal of phase of said potential, and having another component approximately proportional to the integral with respect to time of the magnitude of said potential and also changing sign with reversal of phase of said potential, said two components being concurrently of the same sign, the last mentioned means comprising connections for imposing on said control grid a signal corresponding to said alternating potential and a positive feed-back signal derived from said pulsating anode-cathode current; and means controlled by said pulsating anode-cathode current for reducing said deviation from the predetermined set point.

3. In a control device, means providing an alternating potential which is a function of the deviation of a condition from a predetermined set point and which reverses phase with change of direction of said deviation; a thermionic tube having an anode, a cathode and a control grid; an anode-cathode circuit associated with said tube; means providing an alternating current supply to the anode-cathode circuit of said tube; means responsive to said alternating potential providing through said tube a pulsating anode-cathode current having one component approximately proportional to the magnitude of said potential and changing sign with reversal of phase of said potential, having a second component approximately proportional to the integral with respect to time of the magnitude of said potential and also changing sign with reversal of phase of said potential, said two components being concurrently of the same sign, and having a third component approximately proportional to the derivative with respect to time of the magnitude of said potential and of the same sign as changes of the first mentioned component, the last mentioned means comprising connections for imposing on said control grid a signal corresponding to said alternating potential and a positive feed-back signal derived from said pulsating anode-cathode current; and means controlled by said pulsating anode-cathode current for reducing said deviation from the predetermined set point.

4. In a control device, means providing an alternating potential which is a function of the deviation of a condition from a predetermined set point and which reverses phase with change of direction of said deviation; a thermionic tube having an anode, a cathode and a control grid; an anode-cathode circuit associated with said tube; means providing an alternating current supply to the anode-cathode circuit of said tube; means responsive to said alternating potential providing through said tube a pulsating anode-cathode current having one component which is a substantially time independent function of said potential and which changes sign with reversal of phase of said potential, and having another component varying monotonically with time and in the same sense as the first mentioned component and also changing sign with reversal of phase of said potential, said two components being concurrently of the same sign, the last mentioned means comprising connections for imposing on said control grid a signal corresponding to said alternating potential and a positive feed-back signal derived from said pulsating anode-cathode current; and means controlled by said pulsating anode-cathode current for reducing said deviation from the predetermined set point.

5. In a control device, means providing an alternating potential which is a function of the deviation of a condition from a predetermined set point and which reverses phase with change of direction of said deviation; a thermionic tube having an anode, a cathode, and a control grid; an anode-cathode circuit associated with said tube; means providing an alternating current supply to the anode-cathode circuit of said tube; means responsive to said alternating potential providing through said tube a pulsating anode-cathode current having one component which is a substantially time independent function of said potential and which changes sign with reversal of phase of said potential, having a second component varying monotonically with time and in the same sense as the first mentioned component and also changing sign with reversal of phase of said potential, said two components being concurrently of the same sign, and having a third component approximately proportional to the derivative with respect to time of the magnitude of said potential and of the same sign as changes of the first mentioned component, the last mentioned means comprising connections for imposing on said control grid a signal corresponding to said alternating potential and a positive feed-back signal derived from said pulsating anode-cathode current; and means controlled by said pulsating anode-cathode current for reducing said deviation from the predetermined set point.

ARTHUR E. KITTREDGE.

REFERENCES CITED

The following references are of record in the file of this patent:

UNITED STATES PATENTS

| Number | Name | Date |
|---|---|---|
| 1,315,539 | Carson | Sept. 9, 1919 |
| 2,024,838 | Stansbury | Dec. 17, 1935 |
| 2,040,014 | Moseley | May 5, 1936 |
| 2,068,490 | Hull | Jan. 19, 1937 |
| 2,070,900 | Harris | Feb. 16, 1937 |
| 2,099,536 | Scherbatskoy et al. | Nov. 16, 1937 |
| 2,119,061 | Stein | May 31, 1938 |
| 2,140,350 | Dawson | Dec. 13, 1938 |
| 2,221,579 | Gulliksen | Nov. 12, 1940 |
| 2,222,172 | Dimmick | Nov. 19, 1940 |
| 2,264,487 | Smulski | Dec. 2, 1941 |
| 2,267,216 | Ray | Dec. 23, 1941 |
| 2,272,836 | Gerdien | Feb. 10, 1942 |
| 2,352,103 | Jones | June 20, 1944 |
| 2,396,187 | Means et al. | Mar. 5, 1946 |
| 2,448,564 | Wilkerson | Sept. 7, 1948 |